United States Patent
Dey et al.

(10) Patent No.: US 6,319,608 B1
(45) Date of Patent: Nov. 20, 2001

(54) TITANIUM CHROMIUM ALLOY COATED DIAMOND CRYSTALS FOR USE IN SAW BLADE SEGMENTS AND METHOD FOR THEIR PRODUCTION

(75) Inventors: Nishit Dey, Cedar Falls, IA (US); Yue Meng, Columbus, OH (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/570,957

(22) Filed: May 15, 2000

(51) Int. Cl.⁷ ..................................... B32B 5/16
(52) U.S. Cl. .................. 428/403; 428/404; 428/698; 427/180; 427/217; 427/250; 427/294; 51/293; 51/295; 51/309
(58) Field of Search .................. 428/403, 698, 428/404; 427/180, 217, 294, 250; 51/295, 309, 293

(56) References Cited

U.S. PATENT DOCUMENTS

| | | | |
|---|---|---|---|
| Re. 34,133 | 11/1992 | Thorne | 422/99 |
| 3,465,916 | 9/1969 | Hibbard et al. | 222/595 |
| 3,650,714 | 3/1972 | Farkas | 51/295 |
| 3,879,901 | 4/1975 | Caveney | 51/295 |
| 3,929,432 | 12/1975 | Caveney | 51/295 |
| 4,063,907 | 12/1977 | Lee et al. | 51/295 |
| 4,378,975 | 4/1983 | Tomlinson et al. | 51/309 |
| 4,399,167 | * 8/1983 | Pipkin | 427/217 |
| 4,738,689 | * 4/1988 | Gigl | 51/295 |
| 5,024,680 | 6/1991 | Chen et al. | 51/295 |
| 5,062,865 | 11/1991 | Chen et al. | 51/295 |
| 5,232,469 | 8/1993 | McEachron et al. | 51/295 |

FOREIGN PATENT DOCUMENTS

A79/300337.7   9/1979   (EP).

* cited by examiner

*Primary Examiner*—Leszek Kiliman
(74) *Attorney, Agent, or Firm*—Mueller and Smith, LPA

(57) ABSTRACT

Diamond particles are coated with a Ti metal to form Ti metal coated diamond particles product by contacting the diamond particles with an alloy of the following composition, $Ti_{(1-x)}Cr_x$, where $0.05<x<0.5$, at a temperature of less than about 850° C. and for a time sufficient for the alloy to coat the diamond particles. The resulting coated diamond particles have an average particle size ranging from about 5 to 800 μm and are coated with metal coating composed of an inner carbide layer enriched in Cr content and an outer layer depleted in Cr content.

17 Claims, 1 Drawing Sheet

TITANIUM CHROMIUM ALLOY COATED DIAMOND CRYSTALS FOR USE IN SAW BLADE SEGMENTS AND METHOD FOR THEIR PRODUCTION

CROSS-REFERENCE TO RELATED APPLICATIONS

None

STATEMENT REGARDING FEDERALLY SPONSORED RESEARCH

Not applicable

BACKGROUND OF THE INVENTION

The present invention relates to metal coated abrasive particles or grit and more particularly to such coated grit for improving its retention in saw blade segments.

Superabrasive grit, such as diamond particles, is widely used in sawing, drilling, dressing, grinding, lapping, polishing, and other abrading applications. For these applications, the grit typically is surrounded in a matrix of a metal, such as Ni, Cu, Fe, Co, Sn, W, Ti, or an alloy thereof, or of a resin, such as phenol formaldehyde or other thermosetting polymeric material. By attaching the matrices to a body or other support, tools may be fabricated having the capability to cut through such hard, abrasive materials as concrete, asphalt, masonry, ceramic, brick, or granite, marble, or other rock. Exemplary of such tools is a saw blade as disclosed in U.S. Pat. No. 4,883,500 to be comprised of a circular steel disk having a number of spaced segments disposed about its cutting edge. Each of the segments includes an amount of diamond grit dispersed in a suitable bonding matrix of a metal or alloy, such as Co, bronze, cemented metal carbide, or the like.

The retention of diamond grit within the matrix primarily involves a mechanical component developed from the surrounding of the individual particles by the matrix. The exposure of the grit, accordingly, must be limited so as not to critically weaken the mechanical properties of the surrounding matrix on the grit particles. For example, in a typical saw blade application, the average exposure of the grit is less than about 20% of the total grit height. The limited grit exposure, in turn, limits the cutting rate. Moreover, as the matrix is ablatively worn during the use, the service life of the tool may be shortened as up to two-thirds of the grit is prematurely lost by its being pulled or popped out of the surrounding matrix.

In an attempt to improve grit retention, it has been proposed to coat diamond particles with carbide-forming transition metals, such as Mo, Ti, and Cr. Such metals typically are chemically vapor deposited (CVD) or sputtered onto the surfaces of the diamond grit. Examples of such coatings and processes for the deposition thereof are disclosed in U.S. Pat. Nos. 3,465,916; 3,650,714; 3,879,901; 4,063,907; 4,378,975; 4,399,167; 4,738,689; in U.S. Reissue No. 34,133; and in EP-A79/300,337.7. It has been reported, however, that these coatings may be oxidized and, depending upon the carbide formed, may be brittle. In response, proposals have been made to use a carbide-forming metal layer as part of a multi-layer coating system. As is described in U.S. Pat. Nos. 3,929,432; 5,024,680; 5,062,865; and 5,232,469, systems generally involve the vapor-phase deposition of an inner layer of a thin, 0.05 to 15 micron thick carbide-forming metal, and an outer layer of a more corrosion resistant metal, such as Ni or Cu for protecting the inner layer from oxidation.

BRIEF SUMMARY OF THE INVENTION

Diamond particles are coated with a Ti metal to form Ti metal coated diamond particles product by contacting the diamond particles with an alloy of the following composition, $Ti_{(1-x)}Cr_x$, where x ranges from about 0.05 to about 0.5, at a temperature of less than about 850° C. and for a time sufficient for the alloy to coat the diamond particles. The resulting coated diamond particles have an average particle size ranging from about 5 to 800 μm and are coated with metal coating composed of an inner carbide layer enriched in Cr content and an outer layer depleted in Cr content. The total Cr content in the coating layer usually is no greater than about 10 wt-%.

BRIEF DESCRIPTION OF THE DRAWINGS

For a fuller understanding of the nature and objects of the present invention, reference should be made to the following detailed description taken in conjunction with the accompanying drawings, in which.

Figure 1:
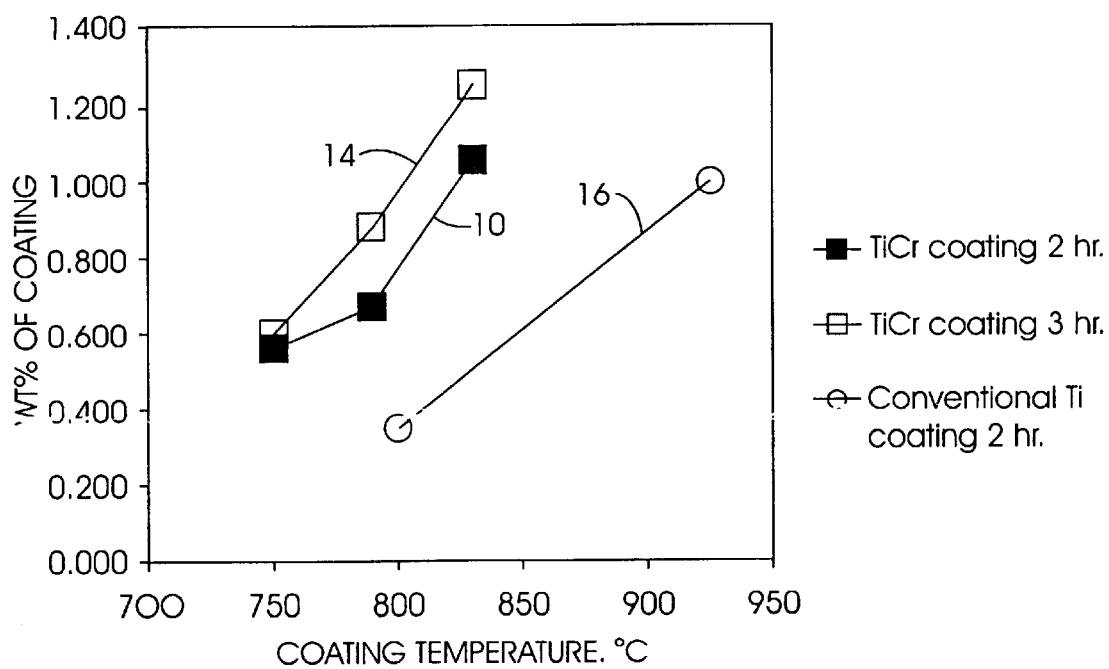
FIG. 1 plots the wt-% of coating as a function of the coating temperature of medium/low grade diamond grit that was coated in the Example.

The drawings will be described in more detail in the Example below.

DETAILED DESCRIPTION OF THE INVENTION

Titanium coating of diamond commonly is used in diamond tool manufacturing, especially with soft cobalt bonds that also require the addition of substantial amounts of Cu as an additive element. However, Ti coating requires temperatures of around 920° C. or higher. Lower coating temperatures (e.g., 900° C. or lower) results in lower coating quality, peeling, or uncoated crystals. Additionally, the thickness of the coating is a function of coating temperature. A 1 wt-% Ti coating requires a coating temperature of 925° C. and a soaking (coating) time of 2 hours. As the coating temperature is reduced to 800° C., the Ti coating thickness decreases to only about 0.3 wt-%. Diamond crystals also typically contain metal occlusions. At high temperature, Fe in the diamond occlusions reacts with the surrounding carbon with consequent degradation in diamond quality (back-conversion of diamond to graphite catalyzed by catalytic Fe at elevated temperature). The Fe—C reaction rate increases rapidly as temperature increases. Experience has shown that a conventional Ti coating procedure results in degradation of the diamond crystal toughness at necessary coating temperatures of around 925° C.

Consequently, the inventive Ti alloy coating serves the general purpose of tooling manufacturing in that lower coating temperatures can be used to achieve the desired coating quality. Enhanced oxidation resistance is but a side benefit of the Ti alloy coating along with consequent reduction in oxidation failures of the Ti alloy coating.

The new Ti alloy coating compositionally can be represented conventionally as follows:

$$Ti_{(1-x)}Cr_x$$

where $x \leq 0.1$ in the coating.
The alloy used to coat the diamond, however has the following composition:

$$Ti_{(1-x)}Cr_x$$

where, x is between about $0.05 \leq x \leq 0.5$
Coating temperatures with the TiCr alloy are around 100° C. lower than coating temperatures for Ti coatings for the same coating thickness. Representative coating temperatures are expected to range from about 750° to about 830° C. with soak times ranging from about 2 to 3 hours. At such coating peratures. The amount of coating was determined. Next, the coated samples were subjected to testing in order to determine their toughness. The data recorded is set forth below.

TABLE 1

| TiCr-2-Hour Cycle | | | TiCr-3-Hour Cycle | | | Conventional Ti-2 Hour Cycle | | |
| --- | --- | --- | --- | --- | --- | --- | --- | --- |
| Temp. (° C.) | Wt-% Coating | TI* | Temp. (° C.) | Wt-% Coating | TI* | Temp. (° C.) | Wt-% Coating | TI* |
| 750 | 0.560 | 86.8 | 750 | 0.600 | 87.4 | 800 | 0.350 | — |
| 790 | 0.670 | 86.9 | 790 | 0.882 | 86.9 | 925 | 1.00 | 78.9 |
| 830 | 1.055 | 86.5 | 830 | 1.255 | 85.9 | — | — | — |

*TI is Toughness Index, Determined after the coating was stripped from the diamond.

temperatures and soak times, good coating quality has been observed. Corresponding coating thickness' will range from about 0.5 wt-% at 750° C. to about 1.25 wt-% at 830° C.

Moreover, a compositionally distinct layer scheme also is observed with the new TiCr alloy coating composition. An inner titanium carbide layer is formed and is enriched in Cr. This inner carbide layer can account for upwards to 60 wt-% or more of the total coating. The outer layer consequently is depleted in Cr, with contents of only a few percent being expected. The inner carbide layer is known to enhance adhesion of the coating to the diamond grit.

As an additional benefit, the addition of Cr to Ti in the coating alloy stabilizes the β phase of the Ti. This phase is known to have very limited oxygen solubility which further contributes to the stability of the coating. Oxidation failure modes of the coated diamond particles, then, are reduced thereby.

As for the preparation of the coated diamond particles, a conventional chemical vapor deposition (CVD) process can be employed, such as is disclosed in the art cited above. It is known that medium/low grade diamond grit (amount of defects and inclusions determines the grade of diamond particles) suffers significant damage of crystal strength when subjected to conventional CVD coating methods. The reduced temperature alloy coating process of the present invention, however, permits medium/low grade diamond grit to be CVD coated without suffering such crystal strength damage. The Examples will demonstrate this aspect of the present invention.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLE

Figure 2:
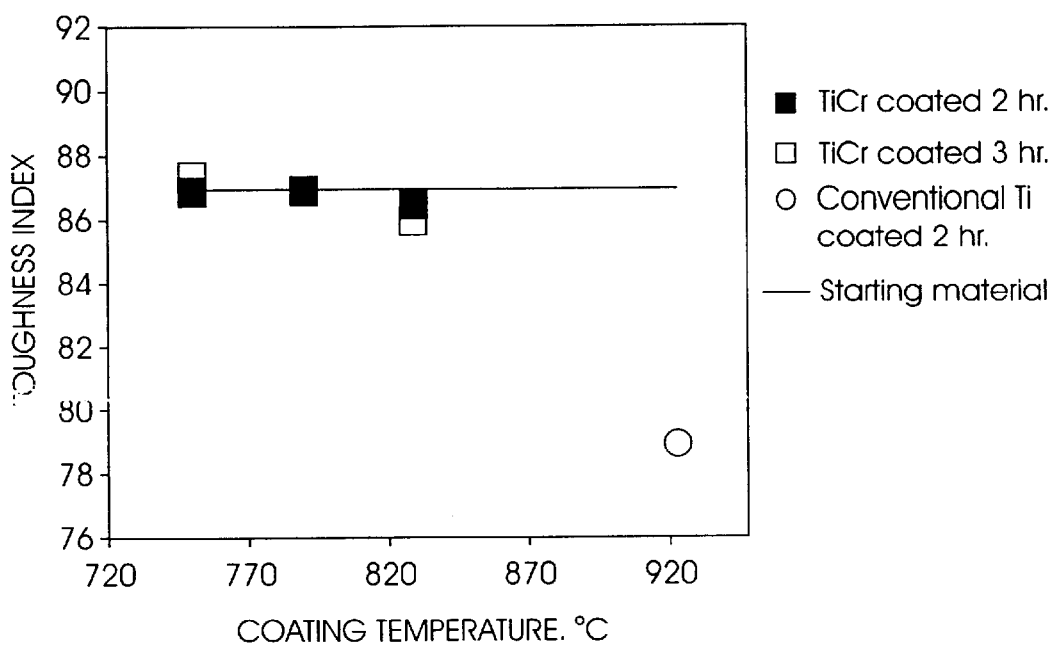
FIG. 2 plots the Toughness Index of the diamond (after the coating was stripped) as a function of the coating temperature as reported in the Example.

Samples of 390 μm medium grade diamond particles with toughness index of 86.9 were subject to a conventional CVD coating process with Ti—Cr alloy and Ti at varying tem- The above-tabulated data also is displayed graphically wherein FIG. 1 plots the wt-% of coating as a function of the coating temperature and FIG. 2 plots the Toughness Index of the diamond (after the coating was stripped) as a function of the coating temperature. In FIG. 1, line 10 represents the wt-% of coating for the TiCr alloy coating subjected to a 2-hour coating cycle, line 12 represents the wt-% of coating for the TiCr alloy coating subjected to a 3-hour coating cycle, and line 14 represents the wt-% of coating for the conventional Ti coating subjected to a 2-hour coating cycle. In FIG. 2, the solid squares represent the toughness index for the TiCr alloy coating subjected to a 2-hour coating cycle, the empty squares represent the TiCr alloy coating subjected to a 3-hour coating cycle, the empty circle represents the conventional TI coating subjected to a 2-hour coating cycle, and the straight line represents the toughness index of the starting diamond particles before being coated.

These data clearly demonstrate that diamond low/medium grade diamond crystals can be coated with the TiCr alloy coating at temperatures of lower than about 850° C. Such coated diamond crystals, however, still exhibit a toughness that is substantially the same as the diamond crystals before they were coated. The conventional Ti coated diamond crystals, however, exhibit a diminished toughness due to the coating process.

X-ray diffraction analysis showed the existence of the TiC phase in the TiCr alloy coated particles. Also, XRF analysis on the coating layer revealed that the amount of Cr in the alloy coating ranged from about 6 to 9 wt-%. Finally, ICP analysis of the outer coating layer (non-carbide layer) revealed that the Cr content was less than 1 wt-%.

What is claimed is:

1. A method for coating diamond particles with a Ti metal to form Ti metal coated diamond particles product, which comprises:
    contacting said diamond particles with an alloy of the following composition, $Ti_{(1-x)}Cr_x$, where x is between about $0.05 \leq x \leq 0.5$, at a temperature of less than about 850° C. and for a time sufficient for said alloy to coat said diamond particles, the resulting coating composed of an inner carbide layer enriched in Cr content and an outer layer depleted in Cr content.

2. The method of claim 1, wherein said coating temperature ranges from between about 750° and 830° C.

3. The method of claim 1, wherein said heating is continued for a time ranging from about 2 to 3 hours.

4. The method of claim 1, wherein said diamond particles range in size from about 5 to about 800 μm.

5. The method of claim 1, wherein said outer layer contains about less than about 10 wt-% of the Cr content of said coating.

6. The method of claim 1, wherein said diamond particles being coated are medium/low grade diamond particles.

7. Diamond particles having an average particle size ranging from about 5 to 800 μm and being coated with a TiCr alloy coating comprising an inner carbide layer enriched in Cr content and an outer layer depleted in Cr content.

8. The diamond particles of claim 7, wherein said outer layer contains less than about 10 wt-% of the Cr content of said coating.

9. The diamond particles of claim 7, which are medium/low grade diamond particles.

10. The diamond particles of claim 7, wherein said TiCr alloy coating comprises $$Ti_{(1-x)}Cr_x$$

where $x \leq 0.1$ in the coating.

11. The diamond particles of claim 9, wherein said TiCr alloy coating comprises $$Ti_{(1-x)}Cr_x$$

where $x \leq 0.1$ in said coating.

12. The diamond particles of claim 7, which range in particle size from about 5 to about 800 μm.

13. The diamond particles of claim 9, wherein said outer layer contains less than about 10 wt-% of the Cr content of said coating.

14. A tool containing the coated diamond particles of claim 7.

15. The tool of claim 14, which is a saw blade.

16. A tool containing the coated diamond particles of claim 9.

17. A tool containing the coated diamond particles of claim 12.

* * * * *